United States Patent [19] [11] 3,714,324
Weech [45] Jan. 30, 1973

[54] IRRADIATED FUEL RECOVERY SYSTEM
[75] Inventor: Marx E. Weech, Pico Rivera, Calif.
[73] Assignee: General Electric Company
[22] Filed: June 18, 1968
[21] Appl. No.: 738,009

[52] U.S. Cl. .................................. 23/341, 23/344
[51] Int. Cl. ............................................. B01d 11/00
[58] Field of Search ..................... 23/341, 343, 344

[56] References Cited

UNITED STATES PATENTS

| 2,848,300 | 8/1958 | Warf | 23/341 |
|---|---|---|---|
| 2,979,379 | 4/1961 | Schmieding et al. | 23/341 |
| 3,092,446 | 6/1963 | Morgan et al. | 23/341 |
| 3,276,850 | 10/1966 | Huet et al. | 23/341 |
| 3,387,945 | 6/1968 | Boudry et al. | 23/341 |

OTHER PUBLICATIONS

Progress in Nucl. Chem. Series III Process Chem. ed F. R. Bruce et al. Pergamon Press, 1956, pp. 140, 141, 196–199

Chemical Processing of Nuclear Fuels, F. S. Martin & G. L. Miles, Academic Press Inc., N. Y., 1958 pp. 105 & 108

Primary Examiner—Carl D. Quarforth
Assistant Examiner—F. M. Gittes
Attorney—Ivor J. James, Jr., Samuel E. Turner, John R. Duncan, Frank L. Neuhauser, Oscar B. Waddell and Melvin M. Goldenberg

[57] ABSTRACT

An improved process for recovering irradiated nuclear reactor fuel material is disclosed. This process includes the steps of extracting uranium, plutonium and neptunium from a solution of irradiated fuel, passing this stream to a reflux column, where a high saturation of uranium is maintained. Separation of uranium from plutonium and neptunium, and further decontamination of uranium results from this high saturation. This process is simple, has a high recovery efficiency and high decontamination, uses relatively small amounts of process reagents and produces a relatively small volume of radioactive waste material.

8 Claims, 1 Drawing Figure

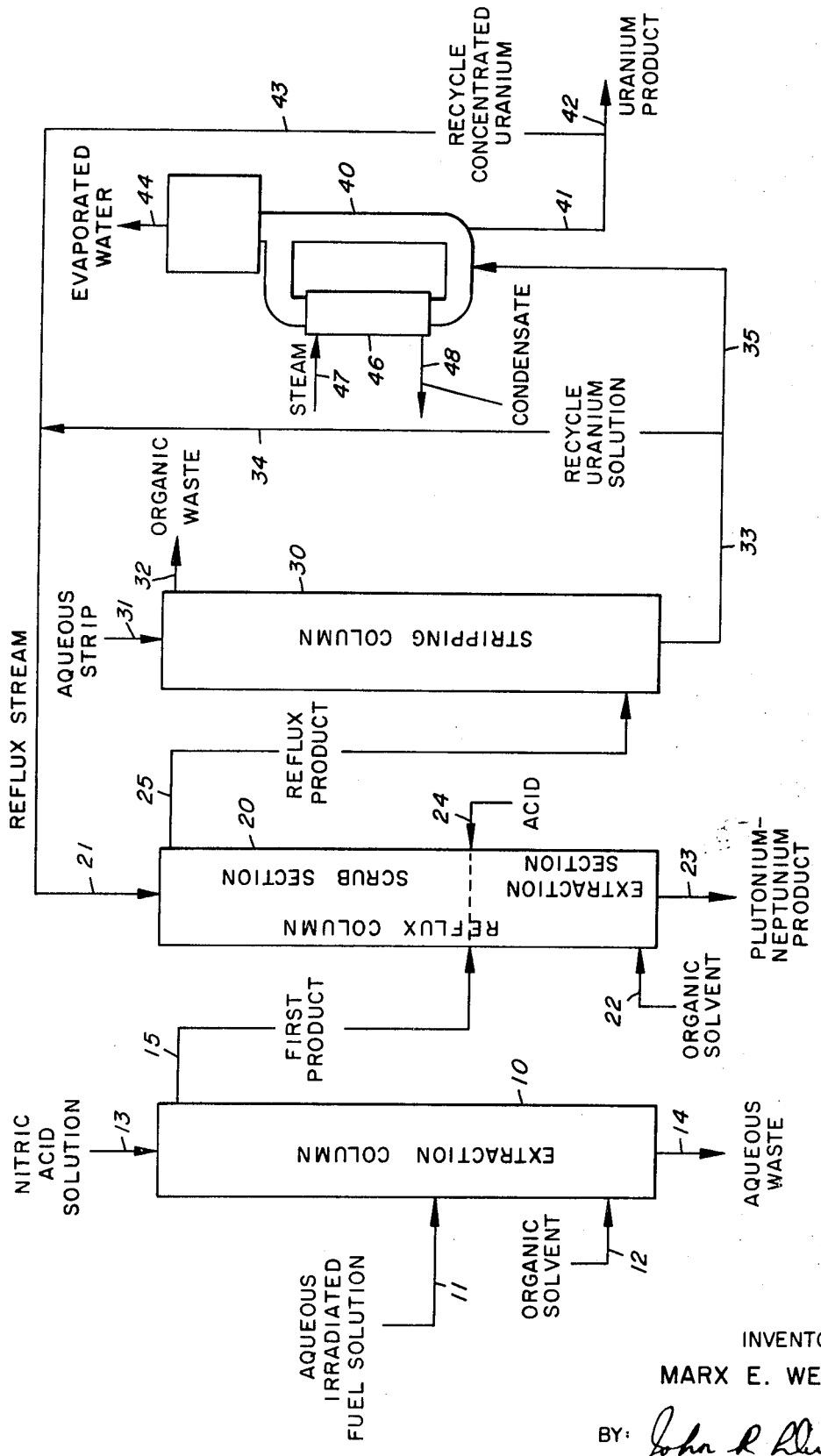

IRRADIATED FUEL RECOVERY SYSTEM

BACKGROUND OF THE INVENTION

Nuclear chain fission reactions and the reactors in which they take place are now well known. A typical nuclear reactor includes a chain reacting assembly or core made up of nuclear fuel material contained in fuel elements. The fuel material is generally encased in a corrosion resistant heat conductive shell or cladding. The reactor core, made up of a plurality of these elements in spaced relationship, is enclosed in a container through which the reactor coolant flows. As the coolant passes between the spaced fuel elements, it is heated by thermal energy released during the fission reaction. The heated coolant then leaves the reactor, the heat energy is used to perform useful work such as by driving a turbine, and the now-cooled coolant is recycled back to the reactor.

The nuclear fuel material contains fissionable atoms, such as U-233, U-235, Pu-239 and Pu-241. The fuel may be in elemental or compound form. When the nucleus of such an atom absorbs a neutron, a nuclear fission frequently occurs. This produces on the average two fission product atoms of lower atomic weight, several high energy neutrons and a large amount of kinetic energy. The kinetic energy of the fission products and fission neutrons is quickly dissipated, producing heat. So long as at least one neutron from each fission event induces a subsequent fission event, the fission reaction is self-sustaining. The fissionable atoms are thus gradually consumed. Some of the fission products produced are strong neutron absorbers (neutron poisons) which absorb neutrons which would otherwise contribute to the chain reaction. The fission reaction, therefore, tends to decrease and cannot be maintained indefinitely on a given level.

In some nuclear reactors, fertile materials such as U-238 may be included in the fuel elements in addition to the fissionable material. During the fission reaction, the fertile material, e.g., U-238, is irradiated with neutrons which convert a part of the U-238 to the fissionable isotope, Pu-239. The concentration of Pu-239 in the fuel gradually rises with irradiation and reaches an equilibrium value. The Pu-239 atoms fission similarly to the original U-235 fuel, thus contributing to the maintenance of the chain reaction.

Except in the breeder-converter type of reactor, the quantity of fissionable material created by fertile atom conversion is always less than the rate at which the original fissionable atom quantity is consumed. Ultimately, the operating power level of the reactor decreases to the point at which the reactor must be shut down for refueling. At least a suitable fraction of the irradiated fuel assemblies are removed and replaced with new fuel having the desired concentration of fissionable atoms and no fission product neutron poisons. The reactivity of the refueled core is thus increased to the extent necessary so that the desired power level can be maintained.

The irradiated reactor fuel removed from the reactor contains a valuable quantity of the original fissionable material. In addition, the irradiated fuel contains a significant quantity of fertile material, and of fissionable material converted from fertile material. In addition, certain fission product and/or transuranic isotopes of considerable value may be contained in the fuel. Therefore, it is highly desirable that the irradiated fuel material be reprocessed to recover and separate these materials for reuse. The fuel and fertile materials separated for reuse must be sufficiently free of highly radioactive fission products to permit direct handling. Fission product separation or "decontamination" sufficient to reduce the original radioactivity to on the order of $10^{-7}$ to $10^{-8}$ of its original value is required. A "decontamination factor" of $10^6$, for example, indicates that the original radioactivity has been reduced by a factor of $10^6$ in the decontamination process.

One currently utilized irradiated fuel reprocessing system has been termed the "Purex" process. This process is currently in use in the chemical processing of fuel from plutonium production reactors. The Purex process utilizes an organic solvent consisting of tributyl phosphate diluted with kerosene to extract the uranium and plutonium selectively from a nitric acid solution of irradiated fuel. The process uses nitric acid as a "-salting" agent in that moderate concentrations cause the uranium and plutonium to extract into the organic solvent while lower concentrations permit the elements to return to the aqueous phase. The Purex process uses two or three separate cycles of such extraction and stripping on the uranium and plutonium, each cycle consisting of a transfer of the uranium and/or plutonium, from the aqueous phase into the organic phase and back into an aqueous phase.

The Purex process has a number of inherent disadvantages. There is a substantial amount of duplicate equipment in view of the two or three complete solvent extraction cycles required to produce sufficiently decontaminated uranium and plutonium products. There is produced a large volume of radioactive waste materials, due to the necessity of treating the organic solvent with various chemical reagents to remove degradation products before the solvent is recycled. This organic solvent degradation becomes quite rapid in the radiation field created by the fission products and it adversely affects processing capabilities. Large quantities of heat are consumed in liquid evaporation which is required in the concentration of streams between the several solvent extraction cycles.

The separation of uranium from plutonium in the Purex process is accomplished by reducing the valence state of plutonium from four to three, using chemical reductants such as ferrous iron with a stabilizing agent such as sulfamic iron. The use of these reductants and stabilizing reagents are disadvantageous due to the cost of the chemicals and the fact that these reagents increase the waste volume. Costs for storage and long term surveillance of radioactive wastes are very high.

Another solvent extraction process for irradiated fuel reprocessing is termed the Redox process. The Redox process uses a non-volatile salting agent and a volatile solvent, in contrast to the non-volatile solvent and volatile salting agent used in the Purex process. In the Redox process, a nitric acid solution is irradiated fuel is extracted with methylisobutyl ketone as the organic solvent. This solvent extracts the plutonium and uranium, leaving an aqueous solution of the fission products. An aqueous solution of aluminum nitrate is used as the salting agent. Plutonium is separated from the organic phase into an aqueous phase and uranium is extracted from the organic phase with dilute nitric acid.

Both the uranium and plutonium containing streams are subjected to second cycles of solvent extraction to improve separation and decontamination.

Although solvent recovery in the Redox process is simplified by its volatile nature, substantial volumes of waste are created in the form of solutions of the salting agent which is not recovered for reuse. The equipment is extensive and complex since the desired plutonium and uranium product decontamination factors are achieved only through three solvent extraction-stripping cycles, with final product cleanup through ion exchange and solid absorption.

Several other processes for recovering irradiated fuel have been proposed using melt refining of metallic fuels and molten salt processing of other fuels. However, these processes have exhibited much lower decontamination and recovery efficiency than the Purex and Redox processes, in addition to requiring large amounts of heat and complex high temperature equipment.

Recently, another process has been developed, as described, for example, in U.S. Pat. Nos. 3,222,124 and 3,359,078. In this process, an aqueous solution of irradiated nuclear fuel is contacted with an anion exchange resin to separate plutonium from uranium and the fission products, followed by fluorination of the substantially plutonium-free uranium and fission products, and fractionation of the volatile fluorides resulting in separation of the uranium from the fission products. This process is capable of high recovery efficiency and excellent decontamination. However, further improvements would be desirable. Especially significant would be further simplification of equipment and a further decrease in the quantity of radioactive waste produced.

SUMMARY OF THE INVENTION

It is, therefore, an object of this invention to provide an irradiated nuclear fuel recovery process overcoming the above-noted problems.

Another object of this invention is to provide an irradiated nuclear fuel recovery process which produces minimal amounts of radioactive waste.

Another object of this invention is to provide an irradiated nuclear fuel recovery process having high recovery efficiency and a high decontamination capability.

Still another object of this invention is to provide a simple and economical irradiated nuclear fuel recovery process which does not require chemical reductants.

The above objects, and others, are accomplished in accordance with this invention by an irradiated nuclear fuel recovery process utilizing a one cycle multi-stage reflux column. In one embodiment of this process, the irradiated fuel is first dissolved in nitric acid. This solution is passed through a first conventional multi-stage solvent extraction contactor. Uranium, plutonium and neptunium are extracted from the aqueous nitric acid stream by an organic solvent stream. This stream passes to a reflux column, which is a second conventional multi-stage extraction contactor. A concentrated uranium-containing reflux stream enters the top of the reflux column to maintain the uranium content greater than 90 percent of saturation to aid in scrubbing of materials other than uranium from the stream. A small acid stream enters the middle of the reflux column to maintain the acid concentration at a value permitting effective extraction of uranium in the lower portion of the reflux column while plutonium and neptunium are not extracted. The uranium product stream exiting the reflux column enters a third multi-stage extraction contactor where the uranium is stripped by an aqueous stream. Part of the aqueous stream from this contactor, containing a high concentration of uranium, is returned as the reflux stream to the upper portion of the reflux column. The uranium product stream may be concentrated in an evaporator, if desired, before further processing. The stream containing plutonium and neptunium may be routed to anion exchange or additional solvent extraction for further separation of plutonium, neptunium and fission products, as desired. This system eliminates the use of reductants, such as ferrous sulfamate, in separating plutonium and uranium, thus decreasing waste volume and chemical reagent costs.

BRIEF DESCRIPTION OF THE DRAWING

The FIGURE shows a simplified schematic flow sheet for the improved fuel recovery process of this invention including a unique reflux system.

DETAILED DESCRIPTION OF THE INVENTION

This process takes advantage of the fact that decontamination efficiency is greatly increased where the solvent uranium saturation is very high. This process employs an organic solvent containing about 25 to about 40 volume percent tributyl-phosphate in a water immiscible hydrocarbon diluent such as kerosene or n-dodecane. When 100 percent saturated, this solvent will contain about 120 grams of uranium per liter. As the saturation of the solvent is increased, the distribution ratios of plutonium and the fission products decrease. Among the fission products, zirconium niobium and ruthenium are of primary concern since these fission products have the highest distribution ratios. The fission products Zr-95, Nb-95 and Ru-103 and -106 are also troublesome because of their amphoteric nature, and in the case of ruthenium, its many valence states. These factors make it difficult to predict their chemical reprocessing operation. However, the distribution ratio of these fission products is lowered substantially by the high uranium saturation of the solvent in the reflux column. The distribution ratio of neptunium is somewhat below that of plutonium and is also decreased substantially by increasing the uranium concentration of the solvent.

Excellent decontamination would be possible in the Purex process if it were possible to maintain the uranium concentration of the solvent at a very high level. However, the saturation must be kept below certain limits in order to extract all of the plutonium and neptunium. If the saturation is raised above this maximum, high losses of these two components will occur out the waste stream of the first column.

The tributyl-phosphate in the solvent decomposes to a slight extent by chemical and radiolytic action into dibutyl and monobutyl-phosphates. These decomposition products form very stable compounds with uranium, plutonium, zirconium and niobium, which are largely extracted into the organic phase. The compounds of zirconium and niobium consequently reduce the decontamination that can be achieved in the column and separation of plutonium and uranium is made more difficult.

In an attempt to overcome this problem, solvent saturation in the commercial Purex process is maintained below 80 percent of saturation in the first scrub stage and at about 65 percent of saturation in the remaining stages. Thus, some uncombined tributyl-phosphate is available to extract the tributyl-phosphate decomposition product/metal ion compounds which limits decontamination that can be attained in a single extraction stripping cycle.

The process of the present invention, on the other hand, holds the solvent saturation at at least 90 percent throughout the reflux column scrub section. Simultaneously, the nitric acid is effectively removed in the early stages of the reflux column scrub section, which leaves only the uranium to combine with the tributyl-phosphate decomposition products. As a result, by mass action the uranium displaces other metal ions which could combine with the tributyl-phosphate decomposition products, freeing this metal ion for removal by counter-current scrubbing. Thus, the decontamination factors more closely approach the values predicted by the distribution ratios. Similarly, the losses of plutonium and neptunium as compounds of tributyl-phosphate decomposition products are substantially reduced by the same mass-action mechanism.

Thus, much improved decontamination factors and improved uranium, plutonium and neptunium recovery are obtained in a system using a first solvent-extraction column (as in the Purex process) in a novel manner with a highly effective reflux column.

Referring now to the FIGURE, there is seen a simplified schematic flow sheet for the process of this invention.

A feed stream comprising irradiated nuclear fuel dissolved in a nitric acid solution is pumped into a first multi-stage solvent extraction column 10 through line 11.

This solution is prepared by removing the fuel from fuel element cladding, such as by the process described in copending application, Ser. No. 715,602, filed Mar. 25, 1968, then dissolving the fuel in nitric acid in a system such as that described in copending application, Ser. No. 590,936, filed Oct. 31, 1966.

An extraction stream comprising tributyl-phosphate in a hydrocarbon solvent enters near the bottom of column 10 through line 12. Any suitable concentration of tributyl phosphate in any suitable solvent may be used. Preferably, from about 25 to about 40 volume percent tributyl phosphate in a solvent such as deoderized kerosene or n-dodecane is used. Best results are obtained with about 30 percent tributyl-phosphate in n-dodecane, since the unbreached hydrocarbon is highly resistant to radiolytic decomposition.

A scrubbing stream comprising from about 1.0 to about 4.0 molar aqueous nitric acid enters the top of column 10 through line 13. Best results are obtained with about 3 molar nitric acid.

The uranium, plutonium and neptunium are extracted together from the aqueous feed stream and scrubbed by the aqueous nitric acid scrub stream which gives partial decontamination. A waste stream comprising aqueous nitric acid and various fission products leaves column 10 through line 14. This waste stream may be further treated, concentrated and finally stored in a waste burial facility.

The first product stream from column 10 leaves through line 15 and enters reflux column 20. This first product stream passes countercurrent to the reflux stream entering through line 21. The reflux stream contains sufficient uranium to raise the solvent uranium content to greater than about 90 percent of saturation. At this saturation, the distribution ratios of plutonium, neptunium, nitric acid and the fission products zirconium, niobium and ruthenium are very low, so these components are scrubbed from the first product stream as it passes through the scrub section of reflux column 20.

A stripping stream, similar in composition to the extraction stream described above enters reflux column 20 through line 22. A small, about 7 to about 12 molar, nitric acid stream enters reflux column 20 through line 24 to bring the aqueous phase acidity up to about 1 molar. At this acidity the uranium is extracted by the organic stripping stream while plutonium, neptunium, nitric acid and fission products that are extracted are refluxed back down from the scrub section and leave reflux column 20 in a plutonium-neptunium product stream through line 23. This prevents loss of uranium into the plutonium-neptunium product stream.

The plutonium-neptunium product stream may be routed to anion exchange (such as described for example in U.S. Pat. No. 3,222,124) or additional solvent extraction (such as described in the *Reactor Handbook*, Second Edition, Vol. II, Interscience Publishers [1961] ) for further separation of plutonium-neptunium from fission products.

The reflux product stream, which contains substantially only uranium and tributyl-phosphate in the organic solvent, leaves reflux column 20 through line 25 and enters a third multi-stage solvent extraction column 30. Here, the uranium is stripped from the organic phase by an aqueous stream entering through line 31. Preferably, this stripping is carried out at a temperature in the range from about 50° to about 60° C to permit as high a uranium concentration as possible. The organic solvent, stripped of uranium, leaves column 30 through line 32. The aqueous uranium containing stream leaves column 30 through line 33 and is divided, part passing through recycle line 34 to make up the reflux stream and part going through line 35 to a uranium product evaporator 40, which may be a conventional syphonreboiler.

The concentrated aqueous uranium stream leaves evaporator 40 through line 41 and is divided, part going to uranium product storage through line 42, and the remainder passing through line 43 to be mixed with the recycle stream from line 34 to make up the reflux stream which is introduced into reflux column 20 through line 21.

Water evaporated in evaporator 40 is discharged through line 44 may be disposed of or reused, as desired.

Evaporator 40 is heated in a conventional manner by steam entering a heat exchange section 46 through line 47 and returning as condensate through line 48.

The concentrated aqueous uranium product contains a very small quantity of the fission products and very little nitric acid, thereby avoiding freezing problems present when a uranium product contains nitric acid and the problems caused by nitric acid when converting the uranyl nitrate product into uranium trioxide.

DESCRIPTION OF A PREFERRED EMBODIMENT

The following example details a preferred embodiment of the process of this invention. Parts and percentages are by weight unless otherwise indicated.

EXAMPLE

A system arranged as seen in the FIGURE is assembled. Each of the columns consists of an 8 inch inner diameter stainless steel shell with a plurality of spaced sieve plates, having about 23 percent openings, spaced along the column length. An air column is connected to each of the multi-stage solvent extraction columns and feed to each is pulsed, so that a back- and- forth pulsing action is maintained in each column, improving extraction efficiency. Typical pulse columns of this type are described in detail on pages 566–578 of the *Reactor Handbook*, Second Edition, Vol II. The reflux column includes nine plutonium stages in the scrub section and five uranium stages in the extraction section. The theoretical basis for such dual-purpose, scrub-extraction columns is detailed on pages 112–114 of the *Reactor Handbook*, Second Edition, Vol. II.

Nuclear fuel material, containing enriched $UO_2$, which has been irradiated to a level of about 20,000 megawatt-days per metric ton of uranium is first stored for about 150 days after removal from the reactor to permit short-lived radioisotopes to decay.

The fuel bundles are then disassembled and the fuel elements are sheared, such as by the process disclosed in copending patent application, Ser. No. 715,602, filed Mar. 25, 1968, to expose the fuel material. The irradiated fuel is then dissolved in about 5.0 molar nitric acid, in a dissolver such as that shown in copending application, Ser. No. 590,936, filed Oct. 31, 1966. This solution contains about 250 grams/liter uranium, about 1.5 grams/liter plutonium, about 0.25 grams/liter neptunium and small amounts of various fission products. Of the fission products, the activity of Zr-95, Nb-95 and Ru-103 and -106 are about 0.28, 0.53 and 0.32 Curies per gram uranium, respectively.

This feed solution is pumped into the first multi-stage solvent extraction column at a rate of about 200 liters per hour. Meanwhile, a solution of n-dodecane containing about 30 volume percent tributyl phosphate is pumped into about the lower end of the first column at a rate of about 640 liters per hour.

The organic solvent extracts uranium, plutonium and neptunium and is scrubbed by a 3 molar nitric acid stream entering the top of the column at a rate of about 200 liters per hour. A first product stream is taken off near the top of the first column at a rate of about 640 liters per hour. This stream is partially decontaminated and contains about 78 grams per liter uranium, about 0.47 grams per liter plutonium and about 0.08 grams per liter neptunium in n-dodecane. Activity of Zr-95, Nb-95 and Ru-103 and -106 is reduced to about $5.6 \times 10^{-5}$, $1.06 \times 10^{-4}$ and $9.7 \times 10^{-4}$ Curies per gram uranium, respectively. This stream includes about 30 volume percent tributyl phosphate and a small amount of nitric acid.

A waste stream exits the bottom of the first column at a rate of about 400 liters per hour. This stream is essentially an aqueous 2.8 molar nitric acid solution containing fission products and less than about 0.01 grams per liter uranium, less than about 0.001 grams per liter plutonium and less than about 0.01 grams per liter neptunium. This stream is treated to remove the nitric acid for recycling, to concentrate the waste material and is eventually sent to a waste disposal facility.

The first product stream from the first column enters the reflux column and passes countercurrent to the reflux stream. The reflux stream contains sufficient uranium to raise the solvent uranium content to greater than 90 percent of saturation. At this saturation, the distribution ratios of plutonium, neptunium, nitric acid and fission products such as zirconium, niobium and ruthenium are very low, so these components are scrubbed from the uranium carrying stream as it passes through the scrub section. Flow of the reflux stream is monitored and adjusted to maintain this degree of saturation. Typically, the reflux flow is about 220 liters per hour of an aqueous solution containing about 172 grams per liter uranium, less than $10^{-5}$ grams per liter plutonium, less than $10^{-6}$ grams per liter neptunium and is less than 0.01 molar in nitric acid. Also, the activity of Zr-95, Nb-95 and Ru103 and -106 are only about $1.2 \times 10^{-10}$, $8.0 \times 10^{-11}$ and $8.1 \times 10^{-11}$ Curies per gram uranium, respectively, in the reflux stream.

A stripping stream containing about 30 volume percent tributyl phosphate in n-dodecane is introduced near the bottom of the reflux column at a rate of about 156 liters per hour.

A small nitric acid stream is introduced into the reflux column to keep the aqueous phase acidity at about 1.0 molar. Acidity in the column is monitored and the flow of this stream is adjusted accordingly. Typically, the acid stream is about 11.6 liters per hour of 10 molar nitric acid. At an acidity of about 1.0 molar, the uranium is extracted into the organic strip stream while the plutonium-neptunium, nitric acid and fission products are not extracted.

An aqueous plutonium-neptunium product stream leaves the bottom of the reflux column at a rate of about 232 liters per hour. This stream contains less than about 0.01 grams per liter uranium, about 1.3 grams per liter plutonium and about 0.22 grams per liter neptunium. This stream is about 1.0 molar in nitric acid. The activity of this stream in Zr-95, Nb-95 and Ru-103 and -106 is about $3.4 \times 10^{-3}$, $6.4 \times 10^{-3}$, and $5.8 \times 10^{-2}$ Curies per gram plutonium, respectively. This stream may be routed to, typically, anion exchange or additional solvent extraction for further decontamination and plutonium-neptunium partition, if desired.

The reflux product stream leaves the reflux column at a rate of about 796 liters per hour. This stream contains about 110 grams per liter uranium, less than about $10^{-6}$ grams per liter plutonium and less than $10^{-7}$ grams per liter neptunium. The activity os Zr-95, Nb-95 and Ru-103 and -106 in this stream have been reduced to about $9.0 \times 10^{-7}$, $5.0 \times 10^{-7}$ and $4.0 \times 10^{-5}$ Curies per gram uranium. The stream contains about 30 volume percent tributyl-phosphate in the n-dodecane carrier.

The reflux product stream enters a third multi-stage solvent-extraction column where it passes countercurrent to an aqueous stripping stream. The stripping stream enters at a rate of about 720 liters per hour. This stream is maintained at a nitric acid molarity of about 0.01. The third column is maintained at a temperature of about 50°-60° C to permit as high a uranium concentration in the aqueous stream leaving the column as possible.

The organic solvent, stripped of uranium, leaves the column for recycling.

The aqueous uranium product leaving the column at a rate of about 720 liters per hour contains about 121.5 grams per liter uranium, less than about $10^{-6}$ grams per liter plutonium and less than about $10^{-7}$ grams per liter neptunium.

About 180 liters per hour of the uranium product stream is recycled as part of the reflux stream. The remainder (about 540 liters per hour) of this stream passes to a syphon reboiler where water is evaporated, concentrating the stream to about 400 grams uranium per liter water.

The concentrated uranium product stream is divided, with about 40 liters per hour going to make up part of the reflux stream and the remaining about 125 liters per hour going to product storage. The product, now in the form of a concentrated aqueous solution of uranyl nitrate may be converted into uranium oxide fuel as desired.

The product contains substantially less fission products than that produced by a single extraction-stripping cycle. The activity of Zr-95, Nb-95 and Ru-103 and -106 in the product is about $9.0 \times 10^{-7}$, $5.0 \times 10^{-7}$ and $4.0 \times 10^{-5}$ Curies per gram uranium, respectively, which compare favorably with the activity of about $4.0 \times 10^{-4}$, $5.0 \times 10^{-4}$ and $4.0 \times 10^{-3}$ Curies per gram uranium, respectively, which would be expected from a single extraction-stripping cycle as the Purex process.

In addition, the concentration of uranium is less than 0.01 grams per liter in the plutonium-neptunium product stream, and the plutonium and neptunium in the concentrated uranium product is less than about $10^{-6}$ and $10^{-7}$ grams per liter, respectively.

Thus, it is apparent that the process of this invention is capable of exceptional decontamination and excellent separation of uranium from other valuable fuel components.

Although specific materials and conditions have been described in the above example, other suitable materials and conditions, as indicated above, may be used with similar results. In addition, other materials may be added to the various process streams, to enhance or otherwise modify their properties.

Other modifications and ramifications of the present invention will occur to those skilled in the art upon reading this disclosure. These are intended to be included within the scope of this invention.

I claim:

1. An irradiated nuclear fuel recovery process comprising the steps of:
   a. dissolving irradiated fuel comprising uranium, plutonium, neptunium and fission products in an aqueous nitric acid solution;
   b. contacting said aqueous fuel solution with an organic solvent comprising tributyl phosphate and a water-immiscible hydrocarbon diluent to extract uranium, plutonium, neptunium and fission products into said organic solvent;
   c. passing the organic solution introduced into a multi-stage reflux column between an upper scrub section and a lower extraction section counter-current to an aqueous reflux stream introduced at the top of the multi-stage reflux column containing sufficient uranium to maintain said organic solution at at least 90 percent of uranium saturation in an upper portion of the multi-stage reflux column, whereby plutonium, neptunium, and fission products are scrubbed from said organic solution:
   d. passing said aqueous reflux stream after said scrubbing in the upper portion of the reflux column in counter-current contact with a stripping stream comprising tributyl phosphate and a water-immiscible hydrocarbon diluent while maintaining a concentration of nitric acid in said reflux stream at about 1 molar in the lower portion of the reflux column, whereby uranium is stripped from said reflux stream and the resulting uranium carrying organic stream becomes part of said organic solution;
   e. contacting the resulting uranium containing organic solution with an aqueous stream whereby uranium is stripped from said organic solution; and
   f. diverting a portion of the uranium-containing aqueous stream resulting from step (e) to make up the reflux stream.

2. The process of claim 1 wherein said organic solvent comprises from about 25 to about 40 volume percent tributyl-phosphate in n-dodecane.

3. The process of claim 1 further including the step of passing the final uranium containing aqueous stream to an evaporator to remove water and form a concentrated uranium product stream.

4. A process for separating uranium from a mixture comprising uranium, plutonium, neptunium and fission products which comprises:
   a. forming a first aqueous nitric acid solution of said mixture;
   b. contacting said first aqueous solution with a first organic solvent stream comprising tributyl phosphate and a water-immiscible hydrocarbon diluent to extract uranium, plutonium and neptunium into the organic phase;
   c. introducing said first organic stream into a reflux column between an upper scrub section and a lower extraction section;
   d. introducing at the top of the reflux column an aqueous, uranium-containing, reflux stream into counter-current contact with said first organic solution in said scrub section to maintain the uranium concentration in said first organic solution in said scrub section above about 90 percent of saturation, whereby plutonium, neptunium and fission products are scrubbed from said first organic solution and pass downwardly with said reflux stream;
   e. introducing a nitric acid stream into said reflux column above said extraction section to maintain a concentration of nitric acid in said extraction section at about 1 molar to enable effective extraction of uranium in the extraction section;

f. introducing a second organic stream comprising tributyl phosphate and a water-immiscible hydrocarbon diluent into said reflux column at the bottom of said extraction section, whereby uranium is extracted into said second organic stream as it passes upwardly counter-current to said reflux stream; and g. taking off an organic reflux product stream above said scrubbing section which contains uranium and is substantially free of plutonium, neptunium and fission products.

5. The process of claim 4 wherein said organic solvent comprises from about 25 to about 40 volume percent tributyl-phosphate in n-dodecane.

6. The process of claim 4 including the further step of contacting said reflux product stream with a second aqueous stream to strip uranium from said reflux product stream and form an aqueous uranium product stream.

7. The process of claim 6 further including the step of passing the final uranium containing aqueous stream to an evaporator to remove water and form a concentrated uranium product stream.

8. The process of claim 7 wherein at least a portion of said uranium containing aqueous stream and of said concentrated uranium product stream is diverted to make up said reflux stream.

* * * * *

UNITED STATES PATENT OFFICE
CERTIFICATE OF CORRECTION

Patent No. 3,714,324     Dated January 30, 1973

Inventor(s) Marx E. Weech

It is certified that error appears in the above-identified patent and that said Letters Patent are hereby corrected as shown below:

In the Abstract, line 9, delete "a". Column 2, line 60, change "is" to read --of--. Column 4, line 39, insert a comma after "zirconium"; and line 46, after "chemical" insert --behavior in the chemical--. Column 6, line 52, "syphonreboiler" should be --syphon-reboiler--. Column 8, line 60, change "os" to read --of--. Column 10, line 12, after "solution" change the colon to a semi-colon.

Signed and sealed this 10th day of July 1973.

(SEAL)
Attest:

EDWARD M. FLETCHER, JR.          Rene Tegtmeyer
Attesting Officer                Acting Commissioner of Patents